(12) United States Patent
Lewis

(10) Patent No.: US 8,450,226 B2
(45) Date of Patent: May 28, 2013

(54) HIGH TEMPERATURE GLASS FIBER INSULATION

(75) Inventor: Albert Lewis, Chino, CA (US)

(73) Assignee: Glass Incorporated, Chino, CA (US)

( * ) Notice: Subject to any disclaimer, the term of this patent is extended or adjusted under 35 U.S.C. 154(b) by 0 days.

(21) Appl. No.: 12/948,835

(22) Filed: Nov. 18, 2010

(65) Prior Publication Data

US 2011/0172077 A1 Jul. 14, 2011

Related U.S. Application Data

(60) Provisional application No. 61/262,514, filed on Nov. 18, 2009.

(51) Int. Cl.
*C03C 3/078* (2006.01)
*C03C 3/091* (2006.01)
*C03C 3/085* (2006.01)
*C03C 3/087* (2006.01)
*C03C 13/00* (2006.01)

(52) U.S. Cl.
USPC .................. 501/72; 501/66; 501/69; 501/70; 501/35

(58) Field of Classification Search
USPC .................. 501/65, 66, 69, 70, 72, 35, 37
See application file for complete search history.

(56) References Cited

U.S. PATENT DOCUMENTS

| | | | | | |
|---|---|---|---|---|---|
| 3,127,277 | A | * | 3/1964 | Tiede | 501/38 |
| 3,785,836 | A | * | 1/1974 | Bacon | 501/61 |
| 4,010,233 | A | * | 3/1977 | Winter et al. | 264/623 |
| 4,979,975 | A | * | 12/1990 | Borrelli et al. | 65/30.11 |

FOREIGN PATENT DOCUMENTS

| | | | | |
|---|---|---|---|---|
| JP | 355080735 | A | * | 6/1980 |
| SU | 418454 | A | * | 9/1974 |

* cited by examiner

*Primary Examiner* — Kaj K Olsen
*Assistant Examiner* — Noah Wiese
(74) *Attorney, Agent, or Firm* — Berliner & Associates

(57) ABSTRACT

Disclosed are glass compositions containing Beryllia in addition to various proportions of Silica, Alumina, Calcium, Magnesia, Sodium, Potassium, Iron, Titania, Zirconia, Manganese and/or Phosphorous. Fibers were produced from the disclosed compositions using standard glass processing equipment. These fibers yielded high temperature fibers having low density, high strength, high modulus, excellent glass surfaces requiring very little bonding material to hold the fibers together. Bio solubility is preferably promoted by ensuring that only trace quantities of alumina are present. Fibers having those properties are particularly suitable for producing high temperature glass fiber insulation for use in aircraft and other vehicles.

37 Claims, No Drawings

HIGH TEMPERATURE GLASS FIBER INSULATION

RELATED APPLICATIONS

This application is based on and claims priority from provisional United States application entitled "HIGH TEMPERATURE GLASS FIBER INSULATION" filed on 18 Nov. 2009 under Ser. No. 61/262,514. The teachings of the above identified application is hereby incorporated by reference in its entirety.

TECHNICAL FIELD

The present invention relates to glass compositions and particularly to glass compositions having good fiberizing characteristics for producing glass fibers have high strength, high durability at high temperatures, high modulus of elasticity and high biosolubility.

BACKGROUND

High temperature glass compositions have heretofore been produced, but they are subject to the shortcomings of having a short working temperature range or being too expensive to produce due to the high cost and energy requirements. There is thus an existing demand for glass compositions which can be readily and economically formed into long and small diameter glass fibers having high temperature, high strength and high modulus. This is particularly true for commercial aircraft and the trucking and automobile industries, for use in various insulation and acoustical products.

Aircraft have been destroyed and people's lives lost by fire, and crashes. Examples are an MD-11 which burned and destroyed in Canada, and an MD-80 which was destroyed by fire and crashed in Texas, USA, and many others. These crashes were blamed on insulation blankets which caught fire and burned. The blankets embodied fibers which were relatively low-temperature fibers and so melted at the high temperatures generated in such an emergency.

The glass compositions of this invention can be readily formed into long and/or short, stable glass fibers having the desired characteristics. Very little refining is required to provide freedom from impurities, thus allowing continuous and discontinuous fibers to be manufactured with relative ease, at a lower cost than has heretofore been practical.

BEST MODE FOR CARRYING OUT THE INVENTION

In the course of research efforts and development work relative to the present invention, a wide range of fiber diameters were investigated, such range being from 0.5 to 5 microns. High temperature insulation values were obtained throughout this range.

The measured insulation values were found to be independent of fiber diameters. Various glass specimens were each prepared utilizing a specific raw material which included Silica and Beryllium, as well as varying amounts of Alumina, Titania, Zirconia, Iron, Sodium, Lithium, Potassium and/or other oxides. These glass specimens were prepared by melting raw batch material in the following approximate range of temperatures: between about 2,800° F. to about 2,900° F., utilizing conventional refractory containers.

Production of fire resistant glass fibers having a useful temperature range from 2000° F. to 2600° F. and the other desirable characteristics required for fabrication and deployment of glass fiber insulation mats was noticeably facilitated by the use of Beryllia in the ratio noted in the disclosed examples and claimed ranges set forth herein. To evaluate the desired properties such as strength, modulus of elasticity, low density, and glass surface durability under extreme moisture conditions, the different glass specimens were fiberized and tested over a long period of time. Multiple specimens of the same glass composition were also evaluated to determine that its fiberizing characteristics were reproducible. The raw materials used were consisted predominantly of Silica, to which was added Alumina, Beryllia Titania and/or Zirconia for improved strength and modulus of elasticity at high temperatures, with various amounts of Sodium, Potassium, Lithium, Boron, Titania and/or Iron oxides being added and adjusted to develop acceptable processing properties, while not jeopardizing the high temperature and strength. In accordance with the above objectives, the raw materials in the different batches were adjusted during the studies to maximize the high temperature properties and processing characteristics, As was previously known to those skilled in this art, Alumina improves the surface of the glass, making it more durable and stronger with a tensile strength as high as 1,130,000 psi (1130 ksi). However, if the fibers are to be fabricated into insulation mats deployed in a closed vehicle environment, it is preferable to reduce their Alumina content to no more than a trace (substantially less than one part in a hundred by weight) to thereby improve the biosolubility of any glass fibers released into the aircraft interior during installation and normal aging of the insulation material.

Prior experiments by the inventor had determined that the addition of Beryllia and Zirconia to a glass, could result in the development of modulus properties as high as $20 \times 10^3$ psi. The modulus increase was attributed to the high field strength of Beryllia and its ability to enter into the silica lattice in fourfold coordination.

As disclosed in the inventor's prior patents, a substantial Iron content functions as a fluidizer, providing good processing characteristics of high temperature glasses at temperatures of only 2400° F. to 2600° F., and thereby facilitating the production of high temperature glass fibers in an efficient fiberizing process that operates at a lower temperature (and is more energy efficient) than would otherwise be possible.

Glass compositions according to the invention have a liquidus temperature of approximately 2,400° F., which is suitable for glass forming. The glass can be formed into fibers for insulation and acoustical parts using the centrifugal rotary process (vertical and horizontal), or blowing and flame processes. It can also be drawn into continuous and staple fibers.

The disclosed high temperature glasses not only requires lower processing energy than other high temperature fibers, they also have better resistance to devitrification at the forming temperature.

The molten glass may also be formed into fibers on a conventional drawing wheel, at speeds up to 4,000 feet per minute at temperatures between 2,400° F. to about 2,900° F. Speeds between about 3,000 to about 4,000 feet per minute are preferable in order to provide optimum filament properties. Fibers may be drawn from about 4 microns to about 14 microns in diameter. Diameters of about 4 microns are preferred. Fibers were produced using the centrifugal, blowing and flame processes. In this research work, resultant fibers were collected on a metal conveyor, and maintained thereon during the rest of the manufacture process. Compositions according to the present invention provide a reduction of cost when compared to other high temperature fibers, because less binder is required than in other compositions due to the improved surface condition and high strength of the fibers. Insulation fiber diameters may range from about 0.5 to 5 microns. All of the above processes may be utilized to manufacture glass fibers in the above noted diameter range.

In the course of development research, it has been postulated that the results obtained are provided by the amorphous glass fibers being converted during the high temperature tests into a ceram glass which forms a fiber mat in which the fiber integrity is maintained, thus preventing high temperatures from penetrating the insulation blanket containing the fibers according to the invention. Temperatures as high as 2,400° F. were applied to aircraft insulation blankets, for several hours.

Beryllium oxide was used to enhance the glass fiber properties, such as enhanced moisture resistance, acoustical properties, strength and modulus of elasticity. It was determined that the other oxides may be substituted for or used in combination with certain other oxides to enhance the properties of the fibers and improve the processing properties. The oxides of Lithium Oxide ($Li_2O$) and Boron Oxide ($B_2O_3$) and Beryllium Oxide (BeO) were used to improve both the processing characteristics and tensile strength. It was determined that Iron, $Li_2O$ and $B_2O_3$, improved the glass surface properties and that iron should preferably be present in the form of $Fe_2O_3$+FeO. Minor oxides identified in the claims are in small amounts normally resulting from impurities in raw materials, and do not affect desired properties. In the research and testing, burn through tests were conducted utilizing Federal Aviation Authority prescribed burn-through test equipment. Blankets comprising fibers according to the present invention prevented burn through for periods of several hours, typically 7 hours or more and up to 12 hours in some instances. Batch burn-through temperatures up to about 2,400° F. were maintained and achieved for extended periods of time.

The presumed contributions of the various components of the studied glass compositions to the production of high temperature glass fibers is summarized in Table 1.

TABLE 1

| Material | Oxide | Improvement |
|---|---|---|
| Silica | $SiO_2$ | Viscosity Controlled |
| Alumina | $Al_2O_3$ | Strength - Durable Surface |
| Beryllia | BeO | Modulus Strength |
| Zirconia | $ZrO_2$ | Strength - Modulus |
| Titania | $TiO_2$ | Strength - Processing |
| Sodium | $Na_2O$ | Processing |
| Potassium | $K_2O$ | Processing |
| Iron | Fe + $Fe_2O_3$ | Processing/Fluidity/High Temperature |
| Lithium | $Li_2O$ | Processing |

Table 2 presents raw materials used in some of the studied batch blends, and Tables 3 and 4 set forth acceptable and preferred ranges of the various oxides contained such blends. Those skilled in the art will know how to adjust the various proportions of the specified raw materials and/or substitute other raw materials to produce other batch blends having desired specific proportions of the various oxides within those ranges.

TABLE 2

TYPICAL BATCH BLENDS

| | Batch Weights | | | | | | | |
|---|---|---|---|---|---|---|---|---|
| Raw Materials | Batch N° 1 | Batch N° 2 | Batch N° 3 | Batch N° 4 | Batch N° 5 | Batch N° 6 | Batch N° 7 | Batch N° 8 |
| Silica Sand | 246.72 | 174.00 | 180.69 | 176.64 | 119.27 | 176.36 | 211.92 | 31.91 |
| Iron Oxide | 30.56 | 4.55 | 38.17 | 37.94 | 21.69 | 32.22 | 31.12 | 4.00 |
| Alumina Hydrate | 35.24 | | 85.10 | 83.56 | | | | |
| Kaolin | | 53.44 | | | 67.74 | 95.74 | 95.40 | 1.03 |
| Colemanite | | | | 21.32 | | | | |
| Boric Acid | | 12.66 | | | | | | |
| Borax | | 3.19 | | | | | | |
| Soda Ash | 10.92 | | 5.02 | 5.08 | | | 3.56 | 2.60 |
| Potash | 3.68 | | | | | | | |
| Lithium Carbonate | | | | | | | 17.04 | |
| Dolomite Limestone | 72.88 | | 91.00 | 75.92 | | | | 8.63 |
| Dolime | | 22.35 | | | 22.62 | 33.63 | 40.96 | |
| Titanium Dioxide | | 1.77 | | | | 3.32 | | 0.69 |
| Basalt | | 128.00 | | | 132.15 | | | |
| Beryl Ore | | | | | 39.50 | 58.70 | | 0.97 |
| Manganese Oxide | | | | | | | | 0.17 |

In the research and testing, fiber insulation blankets were fabricated of fibers from various batch blends within the compositional ranges of Table 2, with each exemplary batch blend being mixed and melted in a refractory furnace and the resultant glasses being successfully fiberized into continuous glass fibers:

Fibers according to the present invention, for insulation blankets, preferably have the following components having the following ranges of percentages:

TABLE 3

COMPOSITIONAL RANGE

| Oxides | Oxide Weight % |
|---|---|
| $SiO_2$ | 10.23 to 71.00 |
| $Al_2O_3$ | 0 to 25.91 |
| $Na_2O$ | 0 to 5.80 |
| $K_2O$ | 0 to 5.70 |
| CaO | 3.76 to 18.0 |
| MgO | 1.84 to 15.0 |
| $Fe_2O_3$ + FeO | 4.64 to 15.5 |
| BeO | 0.5 to 20.0 |
| $TiO_2$ | 0 to 5.0 |
| $ZrO_2$ | 0 to 8.0 |
| MnO | 0 to 6.0 |

For other applications, the following ranges of the various components may be used:

TABLE 4

COMPOSITIONAL RANGE

| Oxides | Oxide Weight % |
|---|---|
| $SiO_2$ | 49 to 76 |
| $Al_2O_3$ | 0 to 23 |
| BeO | 0.5 to 20 |

TABLE 4-continued

COMPOSITIONAL RANGE

| Oxides | Oxide Weight % |
|---|---|
| $B_2O_3$ | 0 to 9 |
| $Li_2O$ | 0 to 9 |
| $Na_2O$ | 0 to 12 |
| $K_2O$ | 0 to 6 |
| CaO | 3 to 18 |
| MgO | 2 to 15 |
| $Fe_2O_3$ + FeO | 1 to 18 |
| $TiO_2$ | 0 to 4 |
| $P_2O_5$ | 0 to 4 |

Particular respective compositions within the above compositional range are defined in the accompanying claims. In particular, for certain applications such as fire resistant insulation blankets in transport aircraft, very low concentrations (zero to only a trace, and in any event less than one wt percent) of $Al_2O_3I$ are desirable.

In addition to the foregoing, the research and testing further demonstrated that other raw materials may be substituted or utilized in conjunction with the disclosed raw materials. It will be understood by those skilled in the art that in addition to the listed oxides, other oxides and materials may be present in the resultant glass in trace amounts less than 1 wt percent, without deviating materially from its desired properties.

Set forth below are typical batch blends that were mixed and melted in a refractory furnace, the resultant glasses being successfully fiberized into continuous insulation glass fibers corresponding to various exemplary embodiments of the present invention. It will be understood by those skilled in the art that in addition to the listed oxides, other oxides and materials may be present in the resultant glass in trace amounts less than 1 wt percent, without deviating materially from its desired properties.

EXAMPLE 1

| Oxides | Weight Percent |
|---|---|
| $SiO_2$ | 46.23 |
| $Al_2O_3$ | 25.91 |
| BeO | 5.10 |
| $Na_2O$ | 2.40 |
| $K_2O$ | 0.82 |
| CaO | 8.27 |
| MgO | 4.06 |
| $Fe_2O_3$ + FeO | 5.11 |
| $TiO_2$ | 1.58 |
| $ZrO_2$ | 0.01 |
| $P_2O_5$ | 0.28 |
| MnO | 0.23 |

EXAMPLE 2

| Oxides | Weight Percent |
|---|---|
| $SiO_2$ | 53.12 |
| $Al_2O_3$ | 11.15 |
| BeO | 10.03 |
| $Na_2O$ | 2.24 |
| $K_2O$ | 0.76 |
| CaO | 7.71 |
| MgO | 3.78 |
| $Fe_2O_3$ + FeO | 9.52 |
| $TiO_2$ | 1.48 |
| $P_2O_5$ | 0.26 |
| MnO | 0.22 |

EXAMPLE 3

| Oxides | Weight Percent |
|---|---|
| $SiO_2$ | 60.95 |
| $Al_2O_3$ | 5.13 |
| BeO | 7.13 |
| $Na_2O$ | 2.24 |
| $K_2O$ | 0.76 |
| CaO | 7.70 |
| MgO | 3.77 |
| $Fe_2O_3$ + FeO | 9.51 |
| $TiO_2$ | 1.47 |
| $ZrO_2$ | 0.86 |
| $P_2O_5$ | 0.26 |
| MnO | 0.22 |

EXAMPLE 4

| Oxides | Weight Percent |
|---|---|
| $SiO_2$ | 52.69 |
| $Al_2O_3$ | 9.4 |
| BeO | 5.48 |
| $Na_2O$ | 2.79 |
| $K_2O$ | 0.95 |
| CaO | 9.61 |
| MgO | 4.71 |
| $Fe_2O_3$ + FeO | 11.87 |
| $TiO_2$ | 1.83 |
| $ZrO_2$ | 0.08 |
| $P_2O_5$ | 0.32 |
| MnO | 0.27 |

EXAMPLE 5

| Oxides | Weight Percent |
|---|---|
| $SiO_2$ | 55.25 |
| $AL_2O_3$ | 10.25 |
| BeO | 8.00 |
| $Na_2O$ | 2.30 |
| $K_2O$ | 1.80 |
| CaO | 8.38 |
| MgO | 3.97 |
| $Fe_2O_3$ + FeO | 8.50 |
| $TiO_2$ | 1.09 |
| $ZrO_2$ | 0.31 |
| $P_2O_5$ | 0.20 |
| MnO | 0.18 |

EXAMPLE 6

| Oxides | Weight Percent |
|---|---|
| $SiO_2$ | 64.55 |
| $AL_2O_3$ | 5.76 |
| BeO | 7.00 |
| $Na_2O$ | 1.96 |
| $K_2O$ | 0.67 |
| CaO | 6.74 |
| MgO | 3.30 |
| $Fe_2O_3$ + FeO | 8.32 |
| $TiO_2$ | 1.28 |
| $ZrO_2$ | 0.01 |
| $P_2O_5$ | 0.22 |
| MnO | 0.19 |

EXAMPLE 7

| Oxides | Weight Percent |
|---|---|
| $SiO_2$ | 65.02 |
| $Al_2O_3$ | 7.14 |
| BeO | 8.00 |
| $Na_2O$ | 2.03 |

EXAMPLE 7-continued

| Oxides | Weight Percent |
|---|---|
| $K_2O$ | 0.01 |
| CaO | 6.53 |
| MgO | 4.26 |
| $Fe_2O_3 + FeO$ | 5.26 |
| $TiO_2$ | 1.33 |
| $ZrO_2$ | 0.42 |
| $P_2O_5$ | 0 |
| MnO | 0 |

Set forth below are illustrative examples of some more recently developed embodiments of the invention.

EXAMPLE 8

| Oxides | Weight Percent |
|---|---|
| $SiO_2$ | 67.55 |
| $Al_2O_3$ | 2.76 |
| BeO | 7.00 |
| $Na_2O$ | 0.67 |
| $K_2O$ | 1.96 |
| CaO | 6.74 |
| MgO | 3.30 |
| $Fe_2O_3 + FeO$ | 8.32 |
| $TiO_2$ | 1.28 |
| $ZrO_2$ | 0.01 |
| $P_2O_5$ | 0.22 |
| MnO | 0.19 |

EXAMPLE 9

| Oxides | Weight Percent |
|---|---|
| $SiO_2$ | 68.00 |
| $Al_2O_3$ | 3.06 |
| BeO | 6.00 |
| $B_2O_3$ | 2.01 |
| $Na_2O$ | 2.53 |
| $K_2O$ | 0.42 |
| CaO | 6.23 |
| MgO | 3.06 |
| $Fe_2O_3 + FeO$ | 7.70 |
| $TiO_2$ | 1.19 |

EXAMPLE 10

| Oxides | Weight Percent |
|---|---|
| $SiO_2$ | 67.36 |
| $Al_2O_3$ | 4.76 |
| BeO | 5.00 |
| $Li_2O$ | 2.86 |
| $Na_2O$ | 1.00 |
| CaO | 5.28 |
| MgO | 3.80 |
| $Fe_2O_3 + FeO$ | 8.46 |
| $TiO_2$ | 1.48 |

EXAMPLE 11

| Oxides | Weight Percent |
|---|---|
| $SiO_2$ | 65.24 |
| $Al_2O_3$ | 0 |
| BeO | 7.00 |
| $Na_2O$ | 6.00 |
| $B_2O_3$ | 7.00 |
| CaO | 8.20 |
| MgO | 1.85 |

EXAMPLE 11-continued

| Oxides | Weight Percent |
|---|---|
| $Fe_2O_3 + FeO$ | 4.01 |
| $TiO_2$ | 0.70 |

EXAMPLE 12

| Oxides | Weight Percent |
|---|---|
| $SiO_2$ | 69.00 |
| $Al_2O_3$ | 0.0 |
| BeO | 8.00 |
| $Na_2O$ | 2.00 |
| $B_2O_3$ | 3.00 |
| CaO | 9.20 |
| MgO | 2.71 |
| $Fe_2O_3 + FeO$ | 5.00 |
| $TiO_2$ | 1.09 |

EXAMPLE 13

| Oxides | Weight Percent |
|---|---|
| $SiO_2$ | 67.55 |
| $Al_2O_3$ | 2.76 |
| BeO | 0.20 |
| $Na_2O$ | 0.67 |
| $K_2O$ | 0.96 |
| CaO | 6.74 |
| MgO | 3.30 |
| $Fe_2O_3 + FeO$ | 8.32 |
| $TiO_2$ | 1.28 |
| $ZrO_2$ | 0.01 |
| $P_2O_5$ | 0.22 |
| MnO | 0.19 |

EXAMPLE 14

| Oxides | Weight Percent |
|---|---|
| $SiO_2$ | 67.36 |
| $Al_2O_3$ | 4.76 |
| BeO | 0 |
| $Li_2O$ | 1.86 |
| $Na_2O$ | 1.00 |
| CaO | 5.28 |
| MgO | 3.80 |
| $Fe_2O_3 + FeO$ | 8.46 |
| $TiO_2$ | 1.48 |
| $ZrO_2$ | 5.00 |

It will be understood that various changes and modifications may be made from the preferred embodiment discussed above without departing from the scope of the present invention, which is established by the following claims and equivalents thereof.

The invention claimed is:
1. Glass fibers of high heat resistance, comprising:
  $SiO_2$ in an amount ranging from about 46.0 to about 76.0 weight percent,
  $Al_2O_3$ in an amount ranging from about 0.0 to about 26.0 weight percent,
  BeO in an amount ranging from about 1.0 to 17.5 weight percent,
  $B_2O_3$ in an amount ranging from about 0 to about 9 weight percent,
  $Na_2O$ in an amount ranging from about 0.0 to about 12.0 weight percent,

K₂O in an amount ranging from about 0.0 to about 6.0 weight percent,
CaO in an amount ranging from about 3.76 to about 18.5 weight percent,
MgO in an amount ranging from about 1.84 to about 15.0 weight percent,
Fe₂O₃+FeO in an amount ranging from about 4.64 to about 18.0 weight percent,
ZrO2is an amount ranging from about 0.0 to about 5.0 weight percent,
TiO₂ in an amount ranging from about 0.0 to about 3.0 weight percent,
P₂O₅ in an amount ranging from about 0.0 to about 4.0 weight percent,
MnO in an amount ranging from about 0.0 to about 1.0 weight percent, and
Li₂O in an amount ranging from about 0 to about 9 weight percent.

2. Glass fibers of high heat resistance, comprising:
SiO₂ in an amount ranging from about 46.0 to about 71.0 weight percent,
Al₂O₃ in an amount ranging from about 0.0 to about 26.0 weight percent,
BeO in an amount ranging from at least 5.0 to about 17.5 weight percent,
B₂O₁₁n an amount ranging from about 0 to about 9 weight percent,
Na₂O in an amount ranging from about 0 to about 5.80 weight percent,
K₂O in an amount ranging from about 0 to about 5.70 weight percent,
CaO in an amount ranging from about 3.76 to about 18.5 weight percent,
MgO in an amount ranging from about 1.84 to about 10.5 weight percent,
Fe₂O₃+FeO in an amount ranging from about 4.64 to about 15.5 weight percent,
ZrO2 in an amount ranging from about 0.0 to about 4.0 weight percent,
TiO₂ in an amount ranging from about 0.72 to about 3.0 weight percent,
P₂O₅ in an amount ranging from about 0.0 to about 4.0 weight percent,
MnO in an amount ranging from about 0.0 to about 1.0 weight percent, and
Li₂O in an amount ranging from about 0 to about 9 weight percent.

3. The glass fibers of claim 2, essentially free of Al₂O₃, Na₂O, K₂O, B₂Oₐ, P₂O₅ and Li₂O.

4. The glass fibers of claim 1, comprising:
SiO₂ in an amount of about 46.23 weight percent,
Al₂O₃ in an amount of about 25.91 weight percent,
BeO in an amount of about 2.0 weight percent,
Na₂O in an amount of about 2.40 weight percent,
K₂O in an amount of about 0.82 weight percent,
CaO in an amount of about 8.27 weight percent,
MgO in an amount of about 4.06 weight percent,
Fe₂O₃+FeO in an amount of about 10.22 weight percent,
TiO₂ in an amount of about 1.58 weight percent,
ZrO₂ in an amount of about 0.01 weight percent,
P₂O₅ in an amount of about 0.28 weight percent,
MnO in an amount of about 0.23 weight percent.

5. The glass fibers of claim 1, comprising:
SiO₂ in an amount of about 66.85 weight percent,
Al₂O₃ in an amount of about 0 weight percent,
BeO in an amount of about 3.29 weight percent,
Na₂O in an amount of about 2.57 weight percent,
K₂O in an amount of about 0.88 weight percent,
CaO in an amount of about 8.87 weight percent,
MgO in an amount of about 4.35 weight percent,
Fe₂O₃+FeO in an amount of about 10.94 weight percent,
TiO₂ in an amount of about 1.70 weight percent,
ZrO₂ in an amount of about 0 weight percent,
P₂O₅ in an amount of about 0.30 weight percent,
MnO in an amount of about 0.25 weight percent.

6. The glass fibers of claim 1, comprising:
SiO₂ in an amount of about 70.67 weight percent,
Al₂O₃ in an amount of about 0 weight percent,
BeO in an amount of about 3.30 weight percent,
Na₂O in an amount of about 2.44 weight percent,
K₂O in an amount of about 2.44 weight percent,
CaO in an amount of about 4.09 weight percent,
MgO in an amount of about 4.10 weight percent,
Fe₂O₃+FeO in an amount of about 10.35 weight percent,
TiO₂ in an amount of about 1.60 weight percent
ZrO₂ in an amount of about 0.01 weight percent,
P₂O₅ in an amount of about 0.76 weight percent,
MnO in an amount of about 0.24 weight percent.

7. The glass fibers of claim 5, essentially free of Al₂O₃.

8. The glass fibers of claim 1, comprising:
SiO₂ in an amount of about 53.69 weight percent,
Al₂O₃ in an amount of about 13.44 weight percent,
BeO in an amount of about 4.40 weight percent,
Na₂O in an amount of about 2.79 weight percent,
K₂O in an amount of about 0.95 weight percent,
CaO in an amount of about 9.61 weight percent,
MgO in an amount of about 4.71 weight percent,
Fe₂O₃+FeO in an amount of about 7.87 weight percent,
TiO₂ in an amount of about 1.83 weight percent,
ZrO₂ in an amount of about 0 weight percent,
P₂O₅ in an amount of about 0.38 weight percent,
MnO in an amount of about 0.33 weight percent.

9. The glass fibers of claim 2, comprising:
SiO₂ in an amount of about 63.48 weight percent,
Al₂O₃ in an amount of about 0 weight percent,
BeO in an amount of about 6.95 weight percent,
Na₂O in an amount of about 2.64 weight percent,
K₂O in an amount of about 2.07 weight percent,
CaO in an amount of about 9.63 weight percent,
MgO in an amount of about 4.56 weight percent,
Fe₂O₃+FeO in an amount of about 8.62 weight percent,
TiO₂ in an amount of about 1.25 weight percent,
ZrO₂ in an amount of about 0.36 weight percent,
P₂O₅ in an amount of about 0.23 weight percent,
MnO in an amount of about 0.21 weight percent.

10. The glass fibers of claim 1, comprising:
SiO₂ in an amount of about 71.63 weight percent,
Al₂O₃ in an amount of about 0 weight percent,
BeO in an amount of about 6.43 weight percent,
Na₂O in an amount of about 2.08 weight percent,
K₂O in an amount of about 0.71 weight percent,
CaO in an amount of about 7.15 weight percent,
MgO in an amount of about 3.50 weight percent,
Fe₂O₃+FeO in an amount of about 6.70 weight percent,
TiO₂ in an amount of about 1.36 weight percent,
ZrO₂ in an amount of about 0.01 weight percent,
P₂O₅ in an amount of about 0.23 weight percent
MnO in an amount of about 0.20 weight percent.

11. The glass fibers of claim 2, comprising:
SiO₂ in an amount of about 69.31 weight percent,
Al₂O₃ in an amount of about 3.08 weight percent,
BeO in an amount of about 7.10 weight percent,
Na₂O in an amount of about 2.04 weight percent,
K₂O in an amount of about 0.01 weight percent, CaO in an amount of about 6.56 weight percent,
MgO in an amount of about 4.28 weight percent,
Fe$_2$O$_3$+FeO in an amount of about 6.29 weight percent,
TiO$_2$ in an amount of about 1.34 weight percent,
ZrO$_2$ in an amount of about 0 weight percent,
P$_2$O$_5$ in an amount of about 0 weight percent,
MnO in an amount of about 0 weight percent.

12. The glass fibers of claim 2, comprising:
SiO$_2$ in an amount of about 63.38 weight percent,
Al$_2$O$_3$ in an amount of about 0 weight percent,
BeO in an amount of about 12.36 weight percent,
Na$_2$O in an amount of about 2.70 weight percent,
K$_2$O in an amount of about 1.07 weight percent,
CaO in an amount of about 9.33 weight percent,
MgO in an amount of about 4.58 weight percent,
Fe$_2$O$_3$+FeO in an amount of about 4.79 weight percent,
TiO$_2$ in an amount of about 1.80 weight percent.

13. The glass fibers of claim 2, comprising:
SiO$_2$ in an amount of about 67.94 weight percent,
Al$_2$O$_3$ in an amount of about 0 weight percent,
BeO in an amount of about 9.34 weight percent,
Na$_2$O in an amount of about 2.63 weight percent,
K$_2$O in an amount of about 2.63 weight percent,
CaO in an amount of about 3.87 weight percent,
MgO in an amount of about 4.07 weight percent,
Fe$_2$O$_3$+FeO in an amount of about 8.79 weight percent,
TiO$_2$ in an amount of about 0.73 weight percent.

14. The glass fibers of claim 1, comprising:
SiO$_2$ in an amount of about 61.67 weight percent,
Al$_2$O$_3$ in an amount of about 4.47 weight percent,
BeO in an amount of about 4.77 weight percent,
Na$_2$O in an amount of about 2.57 weight percent,
K$_2$O in an amount of about 2.01 weight percent,
CaO in an amount of about 9.36 weight percent,
MgO in an amount of about 4.43 weight percent,
Fe$_2$O$_3$+FeO in an amount of about 9.49 weight percent,
TiO$_2$ in an amount of about 1.22 weight percent.

15. The glass fibers of claim 2, comprising:
SiO$_2$ in an amount of about 67.80 weight percent,
Al$_2$O$_3$ in an amount of about 1.80 weight percent,
BeO in an amount of about 8.03 weight percent,
Na$_2$O in an amount of about 1.97 weight percent,
K$_2$O in an amount of about 0.67 weight percent,
CaO in an amount of about 6.77 weight percent,
MgO in an amount of about 3.31 weight percent,
Fe$_2$O$_3$+FeO in an amount of about 8.36 weight percent,
TiO$_2$ in an amount of about 1.29 weight percent.

16. The glass fibers of claim 2, comprising:
SiO$_2$ in an amount of about 59.26 weight percent,
Al$_2$O$_3$ in an amount of about 4.64 weight percent,
BeO in an amount of about 9.20 weight percent
Na$_2$O in an amount of about 1.85 weight percent,
K$_2$O in an amount of about 0.01 weight percent,
CaO in an amount of about 15.09 weight percent,
MgO in an amount of about 3.89 weight percent,
Fe$_2$O$_3$+FeO in an amount of about 4.81 weight percent,
TiO$_2$ in an amount of about 1.27 weight percent.

17. The glass fibers of claim 12, wherein the fibers are resistant to heat and fire for a substantial period of at least three hours to prevent burn through by the conversion of at least a portion of the fibers into a fiber mat of glass ceramic.

18. The glass fibers of claim 13, wherein the fibers are resistant to heat and fire for a substantial period of at least three hours to prevent burn-through by the conversion of at least a portion of the fibers into a fiber mat of glass ceramic.

19. The glass fibers of claim 16, wherein the fibers are resistant to heat and fire for a substantial period of at least three hours to prevent burn-through by the conversion of at least a portion of the fibers into a fiber mat of glass ceramic.

20. The glass fibers of claim 1, comprising:
SiO$_2$ in an amount ranging from about 49.0 to about 76.0 weight percent,
BeO in an amount ranging from about 1.0 to 15.0 weight percent
B$_2$O$_3$ in an amount ranging from about 0 to about 9 weight percent,
Li$_2$O in an amount ranging from about 0 to about 9 weight percent,
Al$_2$O$_3$ in an amount ranging from about 0 to less than 1.0 weight percent,
Na$_2$O in an amount ranging from about 0 to about 12.0 weight percent,
K$_2$O in an amount ranging from about 0.0 to about 6.0 weight percent,
CaO in an amount ranging from about 3.75 to about 15.0 weight percent,
MgO in an amount ranging from about 2.0 to about 15.0 weight percent,
Fe$_2$O$_3$+FeO in an amount ranging from about 4.64 to about 18.0 weight percent,
TiO$_2$ in an amount ranging from about 0.0 to about 4.0 weight percent, and
P$_2$O$_5$ in an amount ranging from about 0.0 to about 4.0 weight percent.

21. Glass fibers of high heat resistance, comprising:
SiO$_2$ in an amount of about 61.63 weight percent,
Al$_2$O$_3$ in an amount of about 0.23 weight percent,
BeO in an amount of 11.04 weight percent,
Na$_2$O in an amount of about 1.80 weight percent,
K$_2$O$_3$ in an amount of about 0.62 weight percent
CaO in an amount of about 13.94 weight percent,
MgO in an amount of about 0.80 weight percent,
Fe$_2$O$_3$+FeO in an amount of about 7.52 weight percent,
TiO$_2$ in an amount of about 1.18 weight percent,
ZrO$_2$ in an amount of about 0.00 weight percent.

22. The glass fibers of claim 2, comprising:
SiO$_2$ in an amount of about 65.850 weight percent,
Al$_2$O$_3$ in an amount of about 0 weight percent,
BeO in an amount of 11.79 weight percent,
K$_2$O in an amount of 0.66 weight percent,
Na$_2$O in an amount of about 1.21 weight percent,
CaO in an amount of about 5.90 weight percent,
MgO in an amount of about 2.26 weight percent,
Fe$_2$O$_3$+FeO in an amount of about 8.16 weight percent,
TiO$_2$ in an amount of about 1.23 weight percent,
ZrO$_2$ in an amount of about 1.97 weight percent.

23. Glass fibers of high heat resistance, comprising:
SiO$_2$ in an amount of about 42.16 weight percent,
Al$_2$O$_3$ in an amount of about 0 weight percent,
BeO in an amount of 11.76 weight percent,
K$_2$O in an amount of 0.66 weight percent,
Na$_2$O in an amount of about 1.21 weight percent,
CaO in an amount of about 23.53 weight percent,
MgO in an amount of about 3.24 weight percent,
Fe$_2$O$_3$+FeO in an amount of about 8.14 weight percent,
TiO$_2$ in an amount of about 4.41 weight percent,
ZrO$_2$ in an amount of about 2.94 weight percent.

24. The glass fibers of claim 2, comprising:
SiO$_2$ in an amount of about 68.23 weight percent,
Al$_2$O$_3$ in an amount of about 2.32 weight percent,
BeO in an amount of 6.53 weight percent,
Na$_2$O in an amount of about 0.68 weight percent,
B$_2$O$_3$ in an amount of about 1.98 weight percent,
CaO in an amount of about 6.81 weight percent, MgO in an amount of about 3.33 weight percent,
$Fe_2O_3$+FeO in an amount of about 8.40 weight percent,
$TiO_2$ in an amount of about 1.29 weight percent,
$ZrO_2$ in an amount of about 0.01 weight percent,
$P_2O_5$ in an amount of about 0.22 weight percent,
MnO in an amount of about 0.19 weight percent.

25. The glass fibers of claim 2, comprising:
$SiO_2$ in an amount of about 62.55 weight percent,
$Al_2O_3$ in an amount of about 0.93 weight percent,
BeO in an amount of about 6.26 weight percent
$Na_2O$ in an amount of about 0.62 weight percent,
$Li_2O$ in an amount of about 1.81 weight percent,
CaO in an amount of about 15.50 weight percent,
MgO in an amount of about 3.06 weight percent,
$Fe_2O_3$+FeO in an amount of about 7.70 weight percent,
$TiO_2$ in an amount of about 1.19 weight percent,
$ZrO_2$ in an amount of about 0.01 weight percent,
$P_2O_5$ in an amount of about 0.20 weight percent,
MnO in an amount of about 0.18 weight percent.

26. The glass fibers of claim 2, comprising:
$SiO_2$ in an amount of about 67.55 weight percent,
$Al_2O_3$ in an amount of about 3.00 weight percent,
BeO in an amount of about 6.76 weight percent,
$Na_2O$ in an amount of about 0.67 weight percent,
$K_2O$ in an amount of about 1.96 weight percent,
CaO in an amount of about 6.74 weight percent,
MgO in an amount of about 3.30 weight percent,
$Fe_2O_3$+FeO in an amount of about 8.32 weight percent,
$TiO_2$ in an amount of about 1.28 weight percent,
$ZrO_2$ in an amount of about 0.01 weight percent,
$P_2O_5$ in an amount of about 0.22 weight percent,
MnO in an amount of about 0.19 weight percent.

27. The glass fibers of claim 2, comprising:
$SiO_2$ in an amount of about 49.18 weight percent,
$Al_2O_3$ in an amount of about 10.04 weight percent,
BeO in an amount of about 13.05 weight percent,
$B_2O_3$ in an amount of about 2.36 weight percent,
$Na_2O$ in an amount of about 1.04 weight percent,
CaO in an amount of about 8.34 weight percent,
MgO in an amount of about 4.09 weight percent,
$Fe_2O_3$+FeO in an amount of about 10.31 weight percent,
$TiO_2$ in an amount of about 1.60 weight percent.

28. The glass fibers of claim 2 comprising:
$SiO_2$ in an amount of about 61.39 weight percent,
$Al_2O_3$ in an amount of about 3.65 weight percent,
BeO in an amount of about 5.25 weight percent,
$Li_2O$ in an amount of about 2.61 weight percent,
$Na_2O$ in an amount of about 0.91 weight percent,
CaO in an amount of about 13.67 weight percent,
MgO in an amount of about 3.46 weight percent,
$Fe_2O_3$+FeO in an amount of about 7.71 weight percent,
$TiO_2$ in an amount of about 1.35 weight percent.

29. The glass fibers of claim 1, comprising:
$SiO_2$ in an amount of about 67.18 weight percent,
$Al_2O_3$ in an amount of about 2.15 weight percent,
BeO in an amount of 6.28 weight percent
$B_2O_3$ in an amount of about 3.10 weight percent,
CaO in an amount of about 7.36 weight percent,
MgO in an amount of about 4.11 weight percent,
$Fe_2O_3$+FeO in an amount of about 9.23 weight percent, and
$TiO_2$ in an amount of about 0.59 weight percent.

30. Glass fibers of high heat resistance, comprising:
$SiO_2$ in an amount of about 59.60 weight percent,
$Al_2O_3$ in an amount of about 0 weight percent,
BeO in amount of about 7.03 weight percent,
$B_2O_3$ in an amount of about 2.01 weight percent,
$Na_2O$ in an amount of about 2.33 weight percent,
$K_2O$ in an amount of about 0.42 weight percent,
CaO in an amount of about 6.23 weight percent,
$Fe_2O_3$+FeO in an amount of about 12.70 weight percent,
$TiO_2$ in an amount of about 1.19 weight percent.

31. The glass fibers of claim 1, comprising:
$SiO_2$ in an amount of about 63.92 weight percent,
$Al_2O_3$ in an amount of about 1.10 weight percent,
BeO in an amount of about 9.82 weight percent
$Li_2O$ in an amount of about 3.60 weight percent,
$Na_2O$ in an amount of about 2.97 weight percent,
CaO in an amount of about 6.77 weight percent,
MgO in an amount of about 2.81 weight percent,
$Fe_2O_3$+FeO in an amount of about 9.01 weight percent.

32. Glass fibers of high heat resistance, comprising:
$SiO_2$ in an amount of about 67.73 weight percent,
$Al_2O_3$ in an amount of about 1.04 weight percent,
BeO in an amount of about 9.03 weight percent,
$B_2O_3$ in an amount of about 3.41 weight percent,
$Na_2O$ in an amount of about 2.81 weight percent,
$K_2O$ in an amount of about 6.41 weight percent,
CaO in an amount of about 2.66 weight percent,
MgO in an amount of about 8.53 weight percent,
$Fe_2O_3$+FeO in an amount of about 8.02 weight percent,
$TiO_2$ in an amount of about 1.24 weight percent.

33. Glass fibers of high heat resistance, comprising:
$SiO_2$ in an amount of about 64.79 weight percent,
$Al_2O_3$ in an amount of about 1.49 weight percent,
$B_2O_3$ in an amount of about 3.97 weight percent,
$Na_2O$ in an amount of about 12.91 weight percent,
CaO in an amount of about 9.63 weight percent,
MgO in an amount of about 4.52 weight percent,
$Fe_2O_3$+FeO in an amount of about 2.00 weight percent,
$TiO_2$ in an amount of about 0.70 weight percent.

34. The glass fibers of claim 1, comprising:
$SiO_2$ in an amount of about 69.01 weight percent,
$Al_2O_3$ in an amount of about 1.09 weight percent,
BeO in an amount of about 4.64 weight percent,
$Li_2O$ in an amount of about 2.52 weight percent,
$K_2O$ in an amount of about 0.88 weight percent,
CaO in an amount of about 9.18 weight percent,
MgO in an amount of about 2.18 weight percent,
$Fe_2O_3$+FeO in an amount of about 9.31 weight percent,
$TiO_2$ in an amount of about 1.20 weight percent.

35. The glass fibers of claim 1, comprising:
$SiO_2$ in an amount of about 60.27 weight percent,
$Al_2O_3$ in an amount of about 1.07 weight percent,
BeO in an amount of about 8.12 weight percent,
$B_2O_3$ in an amount of about 2.57 weight percent,
$Na_2O$ in an amount of about 2.72 weight percent,
CaO in an amount of about 11.00 weight percent,
MgO in an amount of about 5.42 weight percent,
$Fe_2O_3$+FeO in an amount of about 8.83 weight percent.

36. The glass fibers of claim 1, comprising:
$SiO_2$ in an amount of about 68.07 weight percent,
$Al_2O_3$ in an amount of about 0 weight percent,
BeO in an amount of about 7.47 weight percent,
$Na_2O$ in an amount of about 2.92 weight percent,
$B_2O_3$ in an amount of about 4.79 weight percent,
CaO in an amount of about 6.80 weight percent,
MgO in an amount of about 0.91 weight percent,
$Fe_2O_3$+FeO in an amount of about 9.03 weight percent.

37. The glass fibers of claim 1, comprising:
$SiO_2$ in an amount of about 70.28 weight percent,
$Al_2O_3$ in an amount of about 1.08 weight percent,
BeO in an amount of about 5.57 weight percent,
$Na_2O$ in an amount of about 2.19 weight percent,
$B_2O_3$ in an amount of about 1.09 weight percent,
CaO in an amount of about 7.07 weight percent,
MgO in an amount of about 3.53 weight percent,
$Fe_2O_3$+FeO in an amount of about 9.20 weight percent.

* * * * *